United States Patent
Kottilingam et al.

(10) Patent No.: US 10,232,444 B2
(45) Date of Patent: Mar. 19, 2019

(54) CLAD ARTICLE AND METHOD FOR FORMING CLAD ARTICLE

(71) Applicant: GENERAL ELECTRIC COMPANY, Schenectady, NY (US)

(72) Inventors: Srikanth Chandrudu Kottilingam, Greenville, SC (US); Brian Lee Tollison, Honea Path, SC (US); Yan Cui, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/477,846

(22) Filed: Apr. 3, 2017

(65) Prior Publication Data

US 2018/0281071 A1 Oct. 4, 2018

(51) Int. Cl.
*B22F 5/00* (2006.01)
*C08J 5/12* (2006.01)
(Continued)

(52) U.S. Cl.
CPC .............. *B22F 5/00* (2013.01); *B21B 1/026* (2013.01); *B23K 1/0018* (2013.01); *B23K 35/005* (2013.01); *C08J 5/124* (2013.01); *C23C 10/48* (2013.01); *F01D 5/005* (2013.01); *F01D 5/288* (2013.01); *F01D 9/02* (2013.01); *F01D 9/023* (2013.01); *B32B 2262/101* (2013.01);
(Continued)

(58) Field of Classification Search
None
See application file for complete search history.

(56) References Cited

U.S. PATENT DOCUMENTS 4,478,638 A * 10/1984 Smith, Jr. ............. B22F 1/0003
228/119
5,264,011 A * 11/1993 Brown ...................... B22F 5/04
29/889.2
(Continued)

FOREIGN PATENT DOCUMENTS

EP 1 689 897 A1 8/2006
EP 2 808 113 A2 12/2014
(Continued)

OTHER PUBLICATIONS

European Search Report regarding application No. 18162544.3—1006 dated Sep. 10, 2018.
(Continued)

*Primary Examiner* — Adam Krupicka
(74) *Attorney, Agent, or Firm* — Ernest G. Cusick; Frank A. Landgraff

(57) ABSTRACT

A clad article is disclosed including an article and a cladding layer. The article includes a surface layer, at least one cavity disposed within the article below the surface layer, and at least one microcrack disposed in the surface layer. The surface layer includes an HTW alloy. The cladding layer is disposed on a surface of the surface layer, and is formed from a PSP brazed to the article. The cladding layer is disposed over the at least one microcrack. A method for forming the clad article is disclosed including disposing the PSP on the article and brazing the PSP to the article. Brazing the PSP to the article forms the cladding layer disposed on the article over the at least one microcrack.

18 Claims, 1 Drawing Sheet

(51) Int. Cl.
  *C23C 10/48*  (2006.01)
  *B21B 1/02*  (2006.01)
  *B23K 35/00*  (2006.01)
  *B23K 1/00*  (2006.01)
  *F01D 5/00*  (2006.01)
  *F01D 5/28*  (2006.01)
  *F01D 9/02*  (2006.01)

(52) U.S. Cl.
  CPC .... *F05D 2230/22* (2013.01); *F05D 2230/233* (2013.01); *F05D 2230/234* (2013.01); *F05D 2230/237* (2013.01); *F05D 2230/80* (2013.01); *F05D 2230/90* (2013.01); *F05D 2300/611* (2013.01); *F05D 2300/6111* (2013.01)

(56) References Cited

U.S. PATENT DOCUMENTS

| | | | |
|---|---|---|---|
| 7,343,676 B2* | 3/2008 | Ng | B23K 35/0238 228/119 |
| 8,728,388 B2* | 5/2014 | Morris | B22F 3/1055 219/121.65 |
| 2010/0059573 A1 | 3/2010 | Kottilingam et al. | |
| 2016/0199930 A1 | 7/2016 | Yarbrough | |

FOREIGN PATENT DOCUMENTS

| | | |
|---|---|---|
| EP | 2808113 A3 | 9/2015 |
| EP | 2 962 798 A1 | 1/2016 |
| EP | 2962798 A1 | 1/2016 |
| EP | 3 106 619 A1 | 12/2016 |
| EP | 3 112 594 A1 | 1/2017 |
| EP | 3112594 A1 | 1/2017 |
| WO | 2005028690 A1 | 3/2005 |

OTHER PUBLICATIONS

Extended European Search Report and Opinion issued in connection with corresponding EP Application No. 18162544.3 dated Sep. 10, 2018.

* cited by examiner

US 10,232,444 B2

CLAD ARTICLE AND METHOD FOR FORMING CLAD ARTICLE

FIELD OF THE INVENTION

The present invention is directed to clad articles and methods for forming clad articles. More particularly, the present invention is directed to clad articles and methods for forming clad articles including a cladding layer formed from a pre-sintered preform (PSP).

BACKGROUND OF THE INVENTION

Gas turbines, as well as certain other machines, are continuously being modified to provide increased efficiency and performance. These modifications include the ability to operate at higher temperatures and under harsher conditions, which may include the provision of cooling channels.

Increased cooling efficiency may be achieved by minimizing the distance between the cooling channels and the surface of the cooled article. Minimizing the distance between the cooling channels and the surface of the cooled article, however, necessarily yields a thin surface layer separating the cooling channels from the outside environment. For certain compositions and methods of formation, the thin surface layer may be susceptible to the formation of microcracks which may leak cooling fluid and lead to failure of the cooled article. By way of example, surface layer formed of hard-to-weld (HTW) alloys and surface layers formed by additive manufacturing techniques may have a particularly high susceptibility to the formation of microcracks.

BRIEF DESCRIPTION OF THE INVENTION

In an exemplary embodiment, a clad article includes an article and a cladding layer. The article includes a surface layer, at least one cavity disposed within the article below the surface layer, and at least one microcrack disposed in the surface layer. The surface layer includes an HTW alloy. The cladding layer is disposed on a surface of the surface layer, and is formed from a PSP brazed to the article. The cladding layer is disposed over the at least one microcrack.

In another exemplary embodiment, a method for forming a clad article includes disposing a PSP on an article and brazing the PSP to the article. The article includes a surface layer, at least one cavity disposed within the article below the surface layer, and at least one microcrack disposed in the surface layer. The surface layer includes an HTW alloy. Brazing the PSP to the article forms a cladding layer disposed on the article over the at least one microcrack.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
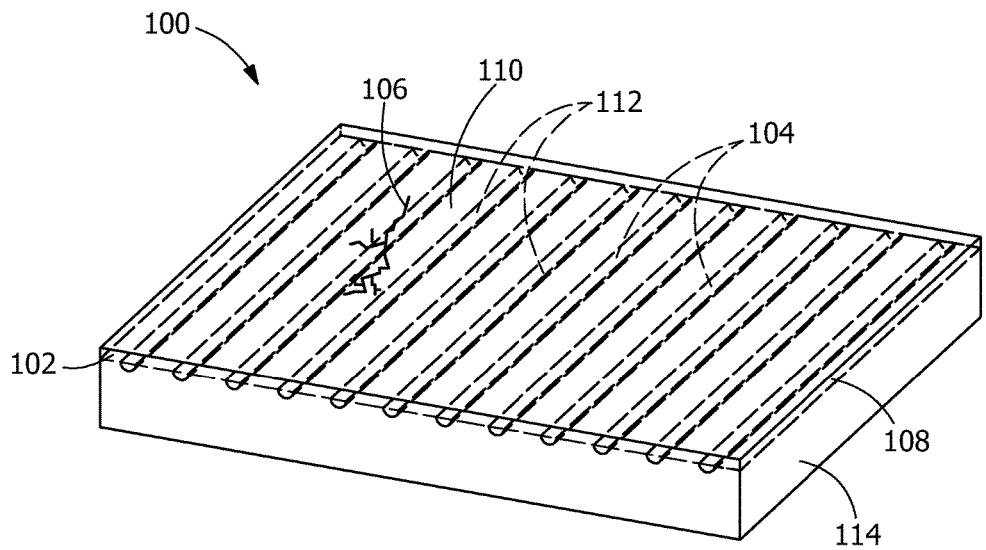
FIG. 1 is a perspective view of an article including a microcrack, according to an embodiment of the present disclosure.

Provided are exemplary clad articles and methods for forming clad articles. Embodiments of the present disclosure, in comparison to articles and methods for forming articles not utilizing one or more features disclosed herein, improve mechanical properties, improve seal integrity, decrease cooling fluid leakage, improve near wall cooling, increase production yield, increase durability, increase strength, improve efficiency, or a combination thereof.

As used herein, an "HTW alloy" is an alloy which exhibits liquation, hot and strain-age cracking, and which is therefore impractical to weld.

As used herein, a "microcrack" is a crack having a maximum length (which may also be construed as a maximum largest surface dimension) less than about 25 µm, and is inclusive of undesirable surface features such as divots, holes, and recesses.

As used herein, "BNi-2" refers to an alloy including a composition, by weight, of about 3% iron, about 3.1% boron, about 4.5% silicon, about 7% chromium, and a balance of nickel.

As used herein, "BNi-3" refers to an alloy including a composition, by weight, of about 4.5% silicon, about 3% boron, and a balance of nickel.

As used herein, "BNi-5" refers to an alloy including a composition, by weight, of about 10% silicon, about 19% chromium, and a balance of nickel.

As used herein, "BNi-6" refers to an alloy including a composition, by weight, of about 11% phosphorous and a balance of nickel.

As used herein, "BNi-7" refers to an alloy including a composition, by weight, of about 14% chromium, about 10% phosphorous, and a balance of nickel.

As used herein, "BNi-9" refers to an alloy including a composition, by weight, of about 15% chromium, about 3% boron, and a balance of nickel.

As used herein, "BNi-10" refers to an alloy including a composition, by weight, of about 11.5% chromium, about 3.5% silicon, about 2.5% boron, about 3.5% iron, about 0.5% carbon, about 16% tungsten, and a balance of nickel.

As used herein, "CMSX-4" refers to an alloy including a composition, by weight, of about 6.4% chromium, about 9.6% cobalt, about 0.6% molybdenum, about 6.4% tungsten, about 5.6% aluminum, about 1.0% titanium, about 6.5% tantalum, about 3% rhenium, about 0.1% hafnium, and a balance of nickel.

As used herein, "CMSX-10" refers to an alloy including a composition, by weight, of about 2% chromium, about 3% cobalt, about 0.4% molybdenum, about 5% tungsten, about 5.7% aluminum, about 0.2% titanium, about 8% tantalum, about 6% rhenium, and a balance of nickel.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

As used herein, "D15" refers to an alloy including a composition, by weight, of about 15% chromium, about 10.25% cobalt, about 3.5% tantalum, about 3.5% aluminum, about 2.3% boron, and a balance of nickel.

As used herein, "DS Siemet" refers to an alloy including a composition, by weight, of about 9% cobalt, about 12.1% chromium, about 3.6% aluminum, about 4% titanium, about 5.2% tantalum, about 3.7% tungsten, about 1.8% molybdenum, and a balance of nickel.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel.

As used herein, "GTD 262" refers to an alloy including a composition, by weight, of about 22.5% chromium, about 19% cobalt, about 2% tungsten, about 1.35% niobium, about 2.3% titanium, about 1.7% aluminum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "HAYNES 230" refers to an alloy including a composition, by weight, of about 22% chromium, about 2% molybdenum, about 0.5% manganese, about 0.4% silicon, about 14% tungsten, about 0.3% aluminum, about 0.1% carbon, about 0.02% lanthanum, and a balance of nickel.

As used herein, "INCONEL 100" refers to an alloy including a composition, by weight, of about 10% chromium, about 15% cobalt, about 3% molybdenum, about 4.7% titanium, about 5.5% aluminum, about 0.18% carbon, and a balance of nickel.

As used herein, "INCONEL 700" refers to an alloy including a composition, by weight, of up to about 0.12% carbon, about 15% chromium, about 28.5% cobalt, about 3.75% molybdenum, about 2.2% titanium, about 3% aluminum, about 0.7% iron, up to about 0.3% silicon, up to about 0.1% manganese, and a balance of nickel.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "INCONEL 792" refers to an alloy including a composition, by weight, of about 12.4% chromium, about 9% cobalt, about 1.9% molybdenum, about 3.8% tungsten, about 3.9% tantalum, about 3.1% aluminum, about 4.5% titanium, about 0.12% carbon, about 0.1% zirconium, and a balance of nickel.

As used herein, "INCONEL 939" refers to an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel.

As used herein, "L605" refers to an alloy including a composition, by weight, of about 20% chromium, about 10% nickel, about 15% tungsten, about 0.1% carbon, and a balance of cobalt.

As used herein, "Mar-M-200" refers to an alloy including a composition, by weight, of about 9% chromium, about 10% cobalt, about 12.5% tungsten, about 1% columbium, about 5% aluminum, about 2% titanium, about 10.14% carbon, about 1.8% hafnium, and a balance of nickel.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "MAR-M-509" refers to an alloy including a composition, by weight, of about 24% chromium, about 10% nickel, about 7% tungsten, about 3.5% tantalum, about 0.5% zirconium, about 0.6% carbon, and a balance of cobalt.

As used herein, "MAR-M-509B" refers to an alloy including a composition, by weight, of about 23.5% chromium, about 10% nickel, about 7% tungsten, about 3.5% tantalum, about 0.45% zirconium, about 2.9% boron, about 0.6% carbon, about 0.2% titanium, and a balance of cobalt.

As used herein, "MGA1400" refers to an alloy including a composition, by weight, of about 10% cobalt, about 14% chromium, about 4% aluminum, about 2.7% titanium, about 4.7% tantalum, about 4.3% tungsten, about 1.5% molybdenum, about 0.1% carbon, and a balance of nickel.

As used herein, "MGA2400" refers to an alloy including a composition, by weight, of about 19% cobalt, about 19% chromium, about 1.9% aluminum, about 3.7% titanium, about 1.4% tantalum, about 6% tungsten, about 1% niobium, about 0.1% carbon, and a balance of nickel.

As used herein, "PMA 1480" refers to an alloy including a composition, by weight, of about 10% chromium, about 5% cobalt, about 5% aluminum, about 1.5% titanium, about 12% tantalum, about 4% tungsten, and a balance of nickel.

As used herein, "PWA 1483" refers to an alloy including a composition, by weight, of about 9% cobalt, about 12.2% chromium, about 3.6% aluminum, about 4.1% titanium, about 5% tantalum, about 3.8% tungsten, about 1.9% molybdenum, and a balance of nickel.

As used herein, "PMA 1484" refers to an alloy including a composition, by weight, of about 5% chromium, about 10% cobalt, about 2% molybdenum, about 5.6% aluminum, about 9% tantalum, about 6% tungsten, and a balance of nickel.

As used herein, "René 65" refers to an alloy including a composition, by weight, of about 13% cobalt, up to about 1.2% iron, about 16% chromium, about 2.1% aluminum, about 3.75% titanium, about 4% tungsten, about 4% molybdenum, about 0.7% niobium, up to about 0.15% manganese, and a balance of nickel.

As used herein, "René 77 (Udimet 700)" refers to an alloy including a composition, by weight, of about 15% chromium, about 17% cobalt, about 5.3% molybdenum, about 3.35% titanium, about 4.2% aluminum, and a balance of nickel.

As used herein, "René 80" refers to an alloy including a composition, by weight, of about 14% chromium, about 9.5% cobalt, about 4% molybdenum, about 3% aluminum, about 5% titanium, about 4% tungsten, about 0.17% carbon, and a balance of nickel.

As used herein, "René 88DT" refers to an alloy including a composition, by weight, of about 16% chromium, about 13% cobalt, about 4% molybdenum, about 0.7% niobium, about 2.1% aluminum, about 3.7% titanium, about 4% tungsten, about 0.1% rhenium, a maximum of about 4.3% rhenium and tungsten, and a balance of nickel.

As used herein, "René 104" refers to an alloy including a composition, by weight, of about 13.1% chromium, about 18.2% cobalt, about 3.8% molybdenum, about 1.9% tungsten, about 1.4% niobium, about 3.5% aluminum, about 3.5% titanium, about 2.7% tantalum, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René 125" refers to an alloy including a composition, by weight, of about 8.5% chromium, about 10% cobalt, about 4.8% aluminum, up to about 2.5% titanium, about 8% tungsten, up to about 2% molybdenum, about 3.8% tantalum, about 1.4% hafnium, about 0.11% carbon, and a balance of nickel.

As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N4" refers to an alloy including a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "René N500" refers to an alloy including a composition, by weight, of about 7.5% cobalt, about 0.2% iron, about 6% chromium, about 6.25% aluminum, about 6.5% tantalum, about 6.25% tungsten, about 1.5% molybdenum, about 0.15% hafnium, and a balance of nickel.

As used herein, "René N515" refers to an alloy including a composition, by weight, of about 7.5% cobalt, about 0.2% iron, about 6% chromium, about 6.25% aluminum, about 6.5% tantalum, about 6.25% tungsten, about 2% molybdenum, about 0.1% niobium, about 1.5% rhenium, about 0.6% hafnium, and a balance of nickel.

As used herein, "René N6" refers to an alloy including a composition, by weight, of about 12.5% cobalt, about 4.2% chromium, about 7.2% tantalum, about 5.75% aluminum, about 6% tungsten, about 5.4% rhenium, about 1.4% molybdenum, about 0.15% hafnium, and a balance of nickel.

As used herein, "TMS-75" refers to an alloy including a composition, by weight, of about 3.5% chromium, about 12.5% cobalt, about 13.7% aluminum, about 2% tungsten, about 1.2% molybdenum, about 1.6% rhenium, about 2% tantalum, about 0.04% hafnium, and a balance of nickel.

As used herein, "TMS-82" refers to an alloy including a composition, by weight, of about 5.8% chromium, about 8.2% cobalt, about 12.2% aluminum, about 0.63% titanium, about 2.9% tungsten, about 1.2% molybdenum, about 0.8% rhenium, about 2.1% tantalum, about 0.04% hafnium, and a balance of nickel.

As used herein, "UDIMET 500" refers to an alloy including a composition, by weight, of about 18.5% chromium, about 18.5% cobalt, about 4% molybdenum, about 3% titanium, about 3% aluminum, and a balance of nickel.

Referring to FIG. 1, in one embodiment, an article 100 includes a surface layer 102, at least one cavity 104 disposed within the article 100 below the surface layer 102, and at least one microcrack 106 disposed in the surface layer 102. The surface layer 102 includes an HTW alloy 108.

The HTW alloy may be any suitable alloy, including, but not limited to, a refractory alloy, a superalloy, a nickel-based superalloy, a cobalt-based superalloy, an iron-based superalloy, an aluminum-titanium superalloy, CMSX-4, CMSX10, DS Siemet, GTD 111, GTD 222, GTD 262, GTD 444, INCONEL 100, INCONEL 700, INCONEL 738, INCONEL 792, INCONEL 939, Mar-M-200, Mar-M-247, MGA1400, MGA2400, PWA 1480, PWA 1483, PWA 1484, René N2, René N4, René N5, René N6, René 65, René 77, René 80, René 88DT, René 104, René 108, René 125, René 142, René 195, René N500, René N515, TMS-75, TMS-82, UDIMET 500, or combinations thereof.

In one embodiment, the composition of the article 100 includes, alternatively consists of, the HTW alloy 108. The surface layer 102 may be disposed on a substrate 114 which is distinct from the surface layer 102 or which is contiguous and compositionally indistinct from the surface layer 102. The substrate 114 may include any suitable composition, including, but not limited to aluminum alloys, iron-based alloys, steel alloys, carbon steel alloys, stainless steel alloys, nickel-based alloys, cobalt-based alloys, titanium-based alloys, titanium-aluminum alloys, refractory alloys, superalloys, nickel-based superalloys, cobalt-based superalloys, iron-based superalloys, or combinations thereof.

The article 100 may be any suitable article 100, including, but not limited to, turbine components. Suitable turbine components include, but are not limited to, hot gas path components, shrouds, buckets (also known as blades), nozzles (also known as vanes), fuel nozzles, combustors, combustion liners, transition pieces, or combinations thereof.

In one embodiment, the at least one cavity 104 includes a cooling channel 112. The at least one cavity 104 may be disposed any suitable distance from the surface 110, including, but not limited to, a distance of less than about 0.05 inches from the surface, alternatively less than about 0.04 inches from the surface, alternatively less than about 0.03 inches from the surface, alternatively less than about 0.02 inches from the surface, alternatively less than about 0.01 inches from the surface, alternatively less than about 0.005 inches from the surface.

The surface layer 102 may include at least one of a direct metal laser melted structure and an electron beam melted structure. In one embodiment, the entirety of the article 100 includes at least one of a direct metal laser melted structure and an electron beam melted structure.

Figure 2:
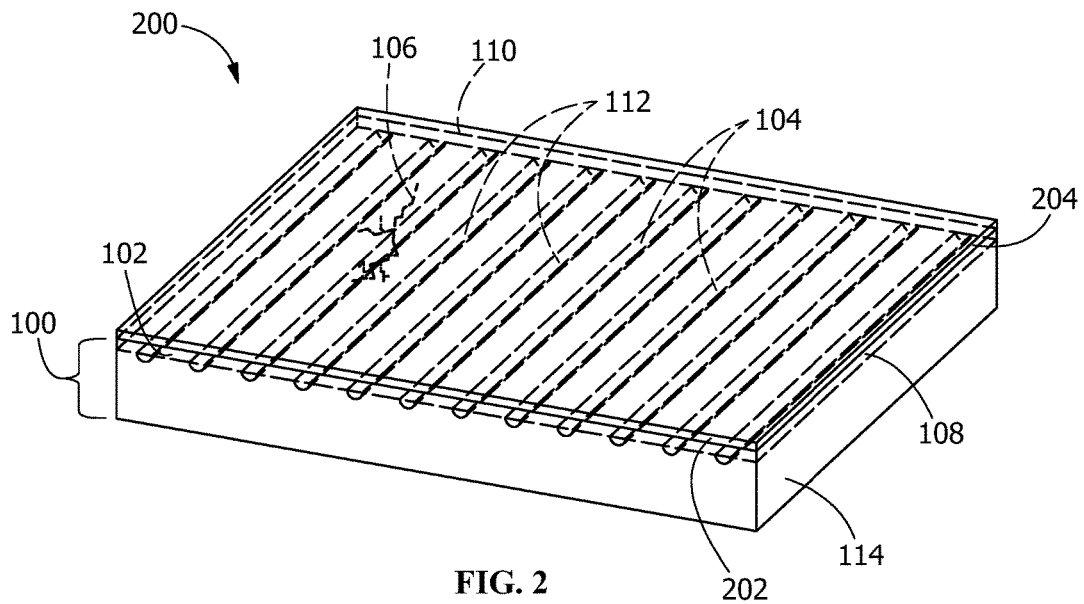
FIG. 2 is a perspective view the article of FIG. 1 with PSP cladding, according to an embodiment of the present disclosure.

Referring to FIG. 2, in one embodiment, a clad article 200 includes a cladding layer 202 and the article 100. The cladding layer 202 is disposed on a surface 110 of the surface layer 102, and is formed from a PSP 204 brazed to the article 100. The cladding layer 202 is disposed over the at least one microcrack 106. The cladding layer 202 may be disposed over a portion of the surface 110 of the article 100 or over the entire surface 110 of the article 100.

In one embodiment, the at least one cavity 104 is less than about 1 vol. % filled with the cladding layer 202, alternatively less than about 0.1 vol. % filled with the cladding layer 202, alternatively less than about 0.01 vol. % filled with the cladding layer 202, alternatively is free of the cladding layer 202.

In one embodiment, the cladding layer 202 includes a first alloy and a second alloy intermixed with one another as distinct phases. In a further embodiment, the first alloy includes a first melting point of at least about 2,400° F., alternatively at least about 2,450° F., alternatively at least about 2,500° F., and the second alloy includes a second melting point of below about 2,350° F., alternatively below about 2,300° F., alternatively below about 2,250° F.

The first alloy may be any suitable alloy, including, but not limited to, an HTW alloy, a refractory alloy, a superalloy, a nickel-based superalloy, a cobalt-based superalloy, an iron-based superalloy, a titanium-aluminum superalloy, an iron-based alloy, a steel alloy, a stainless steel alloy, a cobalt-based alloy, a nickel-based alloy, a titanium-based alloy, GTD 111, GTD 444, HAYNES 188, HAYNES 230, INCONEL 738, L605, MAR-M-247, MAR-M-509, René 108, René 142, René 195, and René N2, or combinations thereof.

The second alloy may be any suitable alloy, including, but not limited to, a braze alloy, an iron-based alloy, a steel alloy, a stainless steel alloy, a cobalt-based alloy, a nickel-based alloy, a titanium-based alloy, DF-4B, D15, MAR-M-509B, BNi-2, BNi-3, BNi-5, BNi-6, BNi-7, BNi-9, BNi-10, or combinations thereof.

The cladding layer 202 may further include a ceramic additive. The ceramic additive may be any suitable ceramic material, including, but not limited to, aluminum oxide, silicon carbide, tungsten carbide, titanium nitride, titanium carbonitride, titanium carbide, or combinations thereof.

The cladding layer 202 may include any suitable thickness, including, but not limited to, a cladding thickness of less than about 0.1 inches, alternatively less than about 0.05 inches, alternatively less than about 0.02 inches, alternatively less than about 0.01 inches, alternatively between about 0.001 inches to about 0.1 inches, alternatively between about 0.005 inches to about 0.04 inches, alternatively between about 0.001 inches to about 0.01 inches, alternatively between about 0.005 inches to about 0.015 inches, alternatively between about 0.01 inches to about 0.02 inches, alternatively between about 0.015 inches to about 0.025 inches, alternatively between about 0.02 inches to about 0.03 inches, alternatively between about 0.025 inches to about 0.035 inches, alternatively between about 0.03 inches to about 0.04 inches, alternatively between about 0.035 inches to about 0.045 inches, alternatively between about 0.04 inches to about 0.05 inches.

In one embodiment, the cladding layer 202 seals the at least one microcrack 106. Sealing the at least one microcrack 106 substantially eliminates fluid communication of the at least one cavity 104 to an external environment through the at least one microcrack 106, alternatively eliminates fluid communication of the at least one cavity 104 to the external environment through the at least one microcrack 106. In one embodiment, substantially eliminating fluid communication of the at least one cavity 104 to the external environment through the at least one microcrack 106 includes reducing fluid communication of the at least one cavity 104 to the external environment through the at least one microcrack 106 by at least about 90%, alternatively at least about 95%, alternatively at least about 99%, alternatively at least about 99.9%.

In one embodiment, a method for forming the clad article 200 includes disposing the PSP 204 on the article 100 and brazing the PSP 204 to the article 200. Brazing the PSP 204 to the article 100 forms the cladding layer 202 disposed on the article 100 over the at least one microcrack 106. Forming the cladding layer 202 may seal the at least one microcrack 106, substantially eliminating fluid communication of the at least one cavity 104 to an external environment through the at least one microcrack 106. Disposing the PSP 204 on the article 100 may include manually or mechanically positioning the PSP 204 on the article 100, or using powder-fed additive manufacturing with laser or wire-fed additive manufacturing with electron beam to form the PSP 204 on the article 100.

In one embodiment, brazing the PSP 204 to the article 100 is free of diffusing the PSP 204 into at least one cavity 104. In another embodiment brazing the PSP 204 to the article 100 diffuses the PSP 204 into at least one cavity 104 such that the least one cavity 104 is less than about 1 vol. % filled with the cladding layer 202, alternatively less than about 0.1 vol. % filled with the cladding layer 202, alternatively less than about 0.01 vol. % filled with the cladding layer 202.

Forming the clad article 200 may further include forming the article by an additive manufacturing process. Suitable additive manufacturing processes include, but are not limited to, direct metal laser melting, electron beam melting, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A clad article, comprising:
   an article, the article including:
      a substrate;
      a surface layer, disposed on the substrate, the substrate including a hard-to-weld (HTW) alloy;
      at least one cavity disposed within the article below the surface layer; and
      at least one microcrack disposed in the surface layer; and
   a cladding layer disposed on a surface of the surface layer opposite the substrate thus positioning the surface layer between the substrate and the cladding layer, the cladding layer comprising a first alloy and a second alloy, and the cladding layer formed from a pre-sintered preform (PSP) brazed to the article,
   wherein the cladding layer is disposed over the at least one microcrack.

2. The clad article of claim 1, wherein the at least one cavity is free of the cladding layer.

3. The clad article of claim 1, wherein the at least one cavity includes a cooling channel.

4. The clad article of claim 3, wherein the cooling channel is disposed less than about 0.01 inches from the surface.

5. The clad article of claim 1, wherein the article is a turbine component.

6. The clad article of claim 5, wherein the turbine component is selected from the group consisting of at least one of a hot gas path component, a shroud, and bucket (blade), a nozzle (vane), a fuel nozzle, a combustor, a combustion liner, a transition piece, and combinations thereof.

7. The clad article of claim 1, wherein the surface layer includes at least one of a direct metal laser melted structure and an electron beam melted structure.

8. The clad article of claim 1, wherein the HTW alloy is selected from the group consisting of a refractory alloy, a superalloy, a nickel-based superalloy, a cobalt-based superalloy, an iron-based superalloy, an aluminum-titanium superalloy, CMSX-4, CMSX10, DS Siemet, GTD 111, GTD 222, GTD 262, GTD 444, INCONEL 100, INCONEL 700, INCONEL 738, INCONEL 792, INCONEL 939, Mar-M-200, Mar-M-247, MGA1400, MGA2400, PWA 1480, PWA 1483, PWA 1484, René N2, René N4, René N5, René N6, René 65, René 77, René 80, René 88DT, René 104, René 108, René 125, René 142, René 195, René N500, René N515, TMS-75, TMS-82, UDIMET 500, and combinations thereof.

9. The clad article of claim 1, wherein the first alloy and the second alloy of the cladding layer includes the first alloy and the second alloy intermixed with one another as distinct phases, the first alloy including a first melting point of at least about 2,400° F., and the second alloy including a second melting point of below about 2,350° F.

10. The clad article of claim 9, wherein the first alloy is selected from the group consisting of an HTW alloy, a refractory alloy, a superalloy, a nickel-based superalloy, a cobalt-based superalloy, an iron-based superalloy, a titanium-aluminum superalloy, an iron-based alloy, a steel alloy, a stainless steel alloy, a cobalt-based alloy, a nickel-based alloy, a titanium-based alloy, GTD 111, GTD 444, HAYNES 188, HAYNES 230, INCONEL 738, L605, MAR-M-247, MAR-M-509, René 108, René 142, René 195, and René N2, and combinations thereof.

11. The clad article of claim 9, wherein the second alloy is selected from the group consisting of a braze alloy, an iron-based alloy, a steel alloy, a stainless steel alloy, a cobalt-based alloy, a nickel-based alloy, a titanium-based alloy, DF-4B, D15, MAR-M-509B, BNi-2, BNi-3, BNi-5, BNi-6, BNi-7, BNi-9, BNi-10, and combinations thereof.

12. The clad article of claim 9, wherein the cladding layer further includes a ceramic additive selected from the group consisting of aluminum oxide, silicon carbide, tungsten carbide, titanium nitride, titanium carbonitride, titanium carbide, and combinations thereof.

13. The clad article of claim 9, wherein the substrate is selected from the group consisting of aluminum alloys, iron-based alloys, steel alloys, carbon steel alloys, stainless steel alloys, nickel-based alloys, cobalt-based alloys, titanium-based alloys, titanium-aluminum alloys, refractory alloys, superalloys, nickel-based superalloys, cobalt-based superalloys, iron-based superalloys, and combinations thereof.

14. The clad article of claim 1, wherein the cladding layer seals the at least one microcrack, substantially eliminating fluid communication of the at least one cavity to an external environment through the at least one microcrack.

15. The clad article of claim 1, wherein the cladding layer includes a cladding thickness of less than about 0.05 inches.

16. The clad article of claim 15, wherein the cladding thickness is between about 0.005 inches to about 0.04 inches.

17. The clad article of claim 16, wherein the cladding thickness is between about 0.001 inches to about 0.01 inches.

18. The clad article of claim 1, wherein the cladding layer is disposed over the entire surface of the article.

* * * * *